United States Patent [19]
Megerle

[11] Patent Number: 5,158,840
[45] Date of Patent: Oct. 27, 1992

[54] GLASS SEALING MATERIALS FOR SODIUM-SULFUR BATTERIES AND BATTERIES MADE THEREWITH

[75] Inventor: Clifford A. Megerle, Thousand Oaks, Calif.

[73] Assignee: Hughes Aircraft Company, Los Angeles, Calif.

[21] Appl. No.: 667,157

[22] Filed: Mar. 11, 1991

[51] Int. Cl.$^5$ .......................................... H01M 10/39
[52] U.S. Cl. .................................. 429/104; 429/185; 501/49; 29/623.2
[58] Field of Search ................. 429/104, 185; 501/49; 29/623.2

[56] References Cited

U.S. PATENT DOCUMENTS

| | | | |
|---|---|---|---|
| 4,291,107 | 9/1981 | Barry et al. | 429/185 X |
| 4,311,772 | 1/1982 | Herczog | 501/49 X |
| 4,419,418 | 12/1983 | Knodler et al. | 429/185 X |
| 4,590,136 | 5/1986 | Buehler et al. | 429/185 X |
| 4,977,044 | 12/1990 | Ludwig | 429/102 X |

*Primary Examiner*—Stephen Kalafut
*Attorney, Agent, or Firm*—Jeanette M. Walder; Terje Gudmestad; W. K. Denson-Low

[57] ABSTRACT

A glass composition having a composition between about 18 and about 23 mole % $Na_2O$, about 3 to about 7 mole % $Cs_2O$, the balance being $B_2O_3$ is adaptable to match the thermal expansion coefficient of a beta"-$Al_2O_3$ solid electrolyte when used to bond and seal the solid electrolyte to a porous support plate (22) in a sodium-sulfur battery (10).

6 Claims, 3 Drawing Sheets

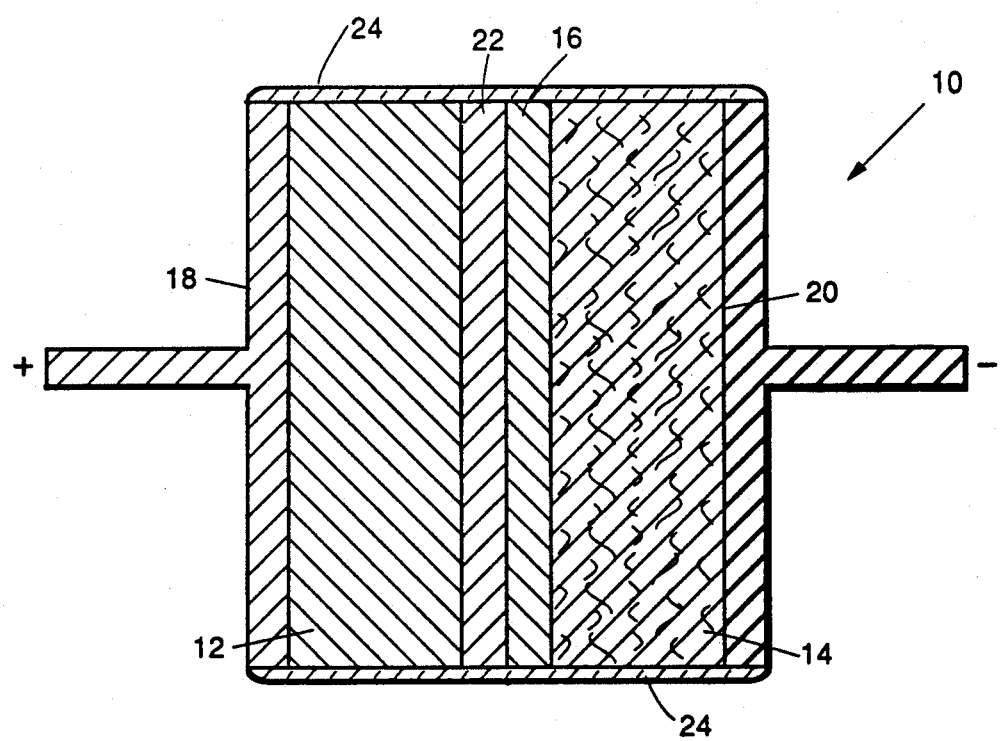
FIG. 1.
FIG. 2.
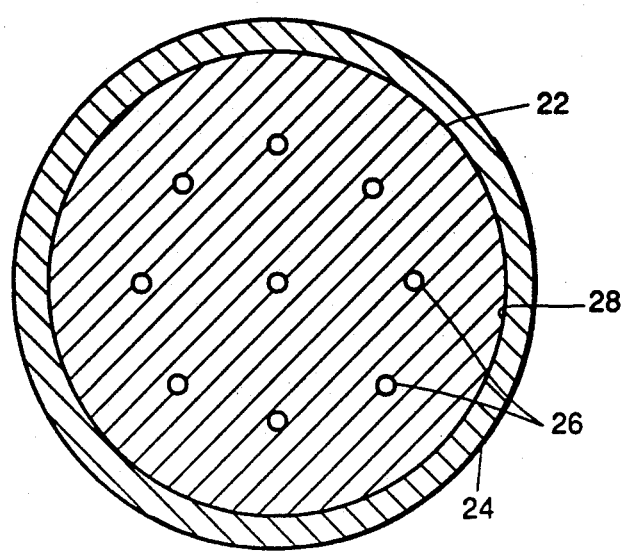

GLASS SEALING MATERIALS FOR SODIUM-SULFUR BATTERIES AND BATTERIES MADE THEREWITH

BACKGROUND OF THE INVENTION

The present invention relates generally to advanced technology thermal battery systems. More particularly, the present invention relates to sodium-sulfur thermal batteries for use in providing a high-power density electrical energy source and most particularly it relates to improved glass sealing systems used in such batteries.

The sodium-sulfur battery was first introduced in the mid 1960's. Since that time, there has been a great deal of interest in developing cell designs which are suitable for a wide variety of applications. Batteries which have been under development include those for use in automobiles and train locomotives. One such battery is described by Frank A. Ludwig in U.S. Pat. No. 4,977,044, the teachings of which are incorporated herein in its entirety. Cell designs have also been investigated for producing batteries for storage of electricity for delayed use in order to level out the production rate of electricity and for space systems requiring high energy density. The sodium-sulfur battery is used as a secondary, that is, rechargeable battery. Its use as a primary (onetime discharge) battery would be unwarranted because of the cost, complexity and fragility involved in edge-sealing and incorporating a ceramic solid electrolyte into a battery design. In addition, there are other relatively inexpensive primary batteries of higher power density available in the marketplace.

Sodium-sulfur thermal batteries typically include a molten sodium electrode, a molten sulfur electrode and a relatively thin sheet of a solid ceramic sodium ion conducting electrolyte which serves as a separator between the sodium and sulfur electrodes. The electrolytic reaction occurs when sodium ions diffuse through the separator to react with the molten sulfur. Consequently, an important requirement for the separator is that it has a sufficiently high rate of diffusion for sodium ions to allow, during initial operation of the thermal battery, the formation of a sodium polysulfide electrolyte within the separator. To provide satisfactory mechanical strength for the thin ceramic sheet separators used in such a structure, it is typically bonded to an underlying support plate comprised of a porous material such as graphite or fused titania.

The sodium-sulfur cell usually operates at a relatively high temperature (300°-400° C.) in order to maintain not only the sulfur and sodium, but also their reaction products, in a molten state. It is believed that the migration of sulfur and sodium into the porous separator occurs when the cell is heated to operating temperatures for the first time to produce a polysulfide gradient. This polysulfide gradient is composed of sodium sulfides having the formula $Na_2S_x$ wherein x is approximately five or less but greater than or equal to one. The composition of the gradient is believed to be:

$Na_2S/Na_2S_2/Na_2S_3/Na_2S_4/Na_2S_5$ $Na_2S$ is a solid at temperatures below 1000° C. As a result, the solid $Na_2S$ acts as a barrier which prevents migration of liquid sulfur or sodium through the entire porous separator. At the same time, the remainder of the polysulfide gradient provides levels of ionic conductivity which are not possible with the previous solid ceramic materials. The use of a porous separator in combination with a polysulfide gradient provides suitable liquid electrode separation while also providing high rates of ionic conduction and resulting high electrical power output.

In use, it is found that a structure as described herein above reduces the electrical resistance of the sodium-sulfur cell, leading to low $I^2R$ power loses and, therefore, high delivered power densities from the battery's cells. In this structure, the porous support structure, by supporting the ceramic separator, allows the use of a separator sheet that would otherwise be too thin to survive the thermal and mechanical stress generated during operation of the cell. At the same time, the porous separator permits sodium to diffuse therethrough and contact the inner side surface of the alumina, so that the cell reaction can occur.

The solid electrolyte is a critical part of the cell configuration because it must provide separation of the liquid sodium from the liquid sulfur in order to prevent catastrophic cell failure. One widely used solid electrolyte in sodium-sulfur batteries is beta"-(double prime) alumina. To improve the bonding between the solid alumina electrolyte and the underlying porous support, one or more glass compositions may be used to join the two materials and seal the edges of the bond line. To be effective, the glass must be able to wet both of the materials and be chemically compatible with the corrosive and high temperature environment of the cell. It must also have a coefficient of thermal expansion which is close (if not identical) to that of the thin and fragile solid alumina electrolyte and also have a viscosity low enough, when molten, to allow fusion to both the porous support and the solid alumina electrolyte at a relatively low processing temperature and yet have a melting point which is high enough to resist deformation over the lifetime of the cell. At the present time, no glass composition available satisfactorily meets all of these requirements.

SUMMARY OF THE INVENTION

The present invention is a glass composition that joins and seals a very thin sheet of beta"-$Al_2O_3$ solid ion-conducting electrolyte to a porous supporting plate. This glass composition which is chemically compatible with the corrosive and high temperature environment in a cell of a sodium-sulfur battery has a composition comprising between about 18 and about 23 moles % $Na_2O$, about 3 to about 7 mole % $Cs_2O$, with the balance being $B_2O_3$. Glass compositions according to this formula may be readily fine tuned to provide close to an exact match to the thermal expansion coefficient of the thin and fragile beta"-$Al_2O_3$ electrolyte. These glass compositions also have viscosities that are low enough so that they can be fused to the beta"-$Al_2O_3$ and the porous support at a relatively low processing temperatures, and melting points high enough to resist deformation over the lifetime of the cell at high temperature.

The glass compositions of the present invention make it possible to construct a very high power density battery. The total savings in the cost and weight of an electric vehicle's battery system, for example, may make electric vehicles viable in the market place. In addition, other applications of this battery system where battery size and weight are important will be benefited.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1, 2 and 3 show side and top views of an exemplary sodium-sulfur battery constructed using the glass composition of the present invention;

DETAILED DESCRIPTION

Figure 3:
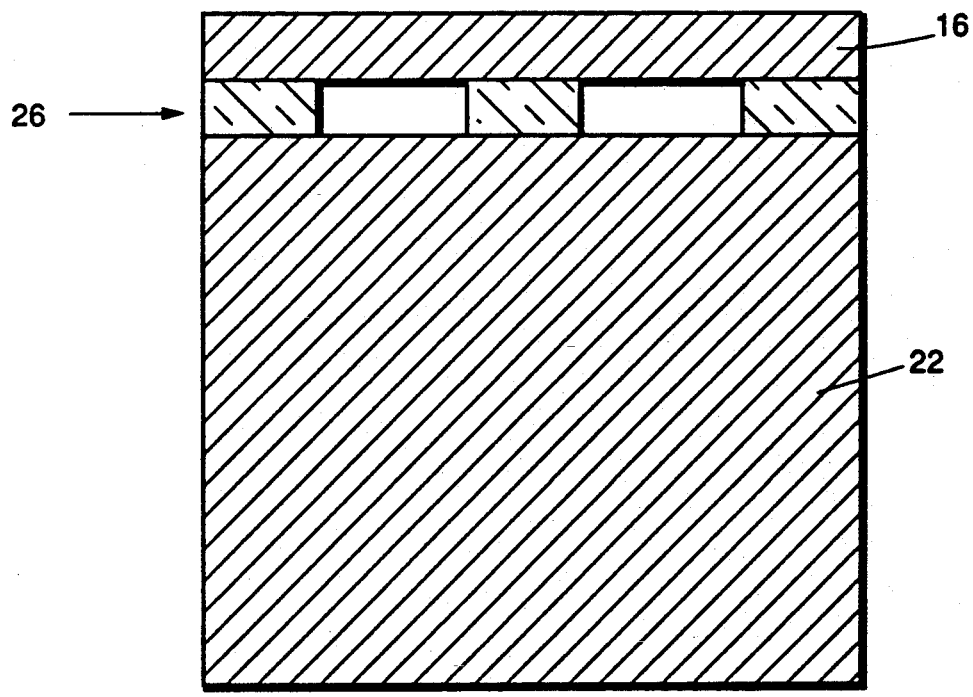

FIGS. 1 and 2 show side and top views of an exemplary sodium-sulfur battery 10 constructed using the glass sealing composition of the present invention. As shown therein the cell 10 includes a metal wick anode 12 which is impregnated with metallic sodium and a carbon graphite felt cathode 14 which is impregnated with sulfur. The anode 12 and cathode 14 are separated by a porous oxide separator 16. Current collectors 18 and 20 are provided at the anode 12 and cathode 14, respectively, for allowing removal of electrical energy from the cell 10. Bonded to the sodium side of the separator 16 is porous support plate 22. This serves to reinforce the separator with the porosity thereof being of sufficient size and quantity so as not to significantly impede the passage of liquid or gaseous sodium making contact with the electrolyte containing ceramic separator 16. The top and bottom surfaces of the assembly are then sealed with glass 24, a top view of said seals being shown as FIG. 2.

The material used to form the metallic wick anode 12 may be any known material that preferentially wets sodium metal. These materials include nickel, steel, or any other suitable metallic material. Preferably the wick anode 12 is made from nickel felt which is commercially available. The pore size and surface area of the nickel felt may be varied provided that sufficient wetting and impregnation with sodium metal is possible in order to form a suitable liquid electrode. Nickel felt suitable for this application is marketed under the trade name Fibrex by the National Standard Company, Niles, Mich.

The wick anode 12 or felt cathode 14 utilized to support the liquid sulfur may be any conductive fibers, powders or felt materials which are preferentially wet by molten sulfur. Commercially available graphite felts are the materials of choice in state-of-the-art sodium-sulfur battery technology. Any of the felts used in these batteries is adequate for the purposes of the present invention. An adequate felt is SGF available from Stackpole Corp., St. Marys, Pa.

The porous material used for the separator 16 should have sufficient porosity to allow preliminary migration of fluid (liquid or gaseous) sodium metal and fluid (liquid or gaseous) sulfur therethrough during initial operation of the battery to form the initial polysulfide electrolyte gradient. In the present invention, the term "preliminary migration" is used to denote that migration which occurs upon initial operation of the cell, in order to establish the polysulfide electrolyte gradient across the solid electrolyte. Once this gradient is established, there is no longer a free flow of the fluids; however, the gradient established is sufficient to promote diffusion through the separator 16. The porous separator 16 can be made from a ceramic material such as silica fibers sintered into a porous mat such as is available from Lockheed Corp., Sunnyvale, Calif. as FRCI-12 or HTP-12. Other suitable porous ceramic materials include zirconia or alumina felt and paper available from Zircar Products, Inc., Florida, New York with Zircar alumina felt and paper APA-1, APA-2 and APA-3 being preferred. Especially preferable is beta" alumina which is available from Ceramatec (USA), Brown-Boveri (Switzerland) or NKG (Japan).

As shown in FIGS. 1 and 2, the assembly of the separator 16 with the porous support plate 22 is typically accomplished by the use of a sealing glass 24 which, in the preferred embodiment performs two separate functions and is in two different places. In the first of these, the glass forms a plurality of short supporting seal glass pedestals 26 which, in a subsequent fusion process, melt and form a mechanically strong bond between the ceramic top separator 16 and the underlying graphite support plate 22 below. In the second place the glass is formed as a continuous band 28 around the circumference of the battery 10. Sealing and bonding occur when the glass is heated beyond its fusion temperature, as will be described herein below.

In the structural embodiment shown, the porous support plate 22 supports the separator 16 while allowing sodium ions to diffuse through it to come in contact with the inner surface thereof. Any thermally stable porous material able to resist the environment of an operating sodium-sulfur cell may be used for this purpose. Typical support materials used for this purpose are graphite and fused titania. In providing a finished structure having the requisite electrical, thermal and mechanical properties, the glass 24 used to bond the separator 16 to the graphite support plate 22 must have a thermal expansion coefficient, viscosity, and overall chemical inertness which closely match those of the ceramic separator.

The present invention is a glass composition that can be fine tuned to closely match the thermal expansion coefficient of a solid, thin beta"-$Al_2O_3$ electrolyte. The value of the thermal expansion coefficient for this material is about $7.8 \times 10^{-6}$ cm/cm/°C. It has been found that glass compositions comprising $Na_2O.Cs_2O$ and $B_2O_3$, wherein the glass comprises between about 18 and about 23 mole % $Na_2O$, about 3 to about 7 mole % $Cs_2O$, with the balance being $B_2O_3$, have the necessary chemical resistance to the hostile cell environment and, further, offer the ability to fine tune the thermal expansion coefficient of the glass to a desired value, as discussed above. Preferably, the glass comprises between about 19 and about 21 mole % $Na_2O$ and about 4 to about 6 mole % $Cs_2O$, with the $B_2O_3$ being 75 mole % of the total glass composition.

Figure 4:
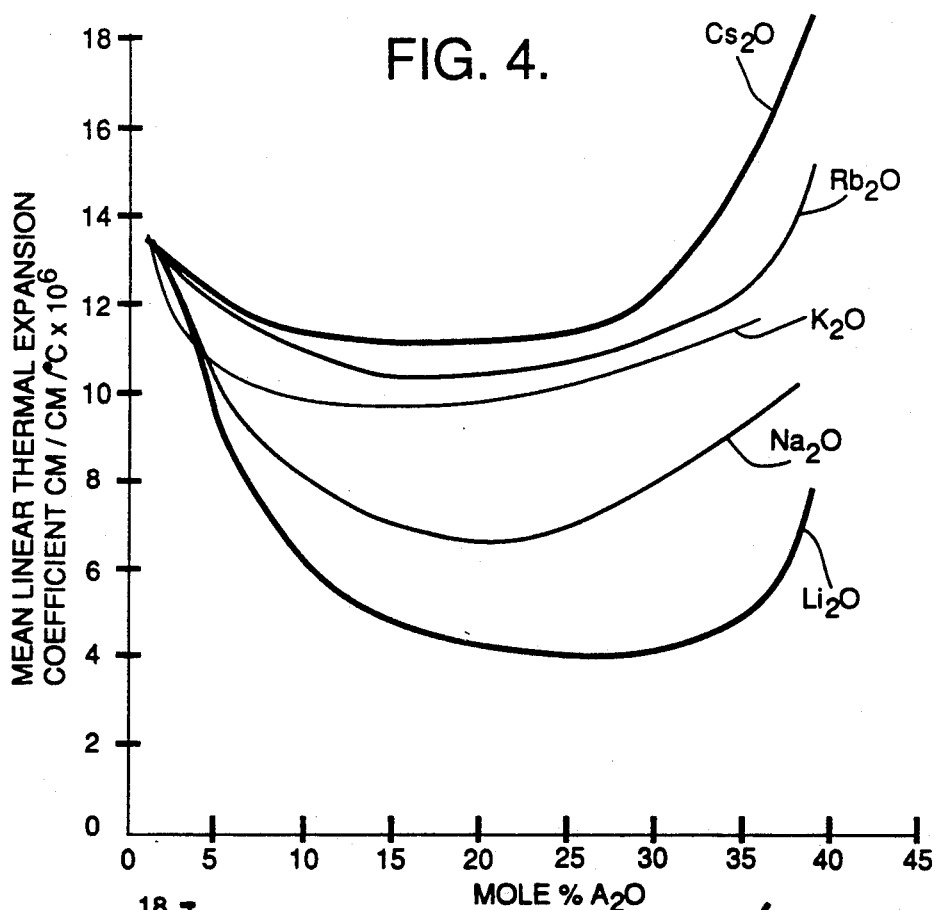
FIG. 4 is a graph showing the thermal expansion coefficients of alkali-borate glasses.
Figure 5:
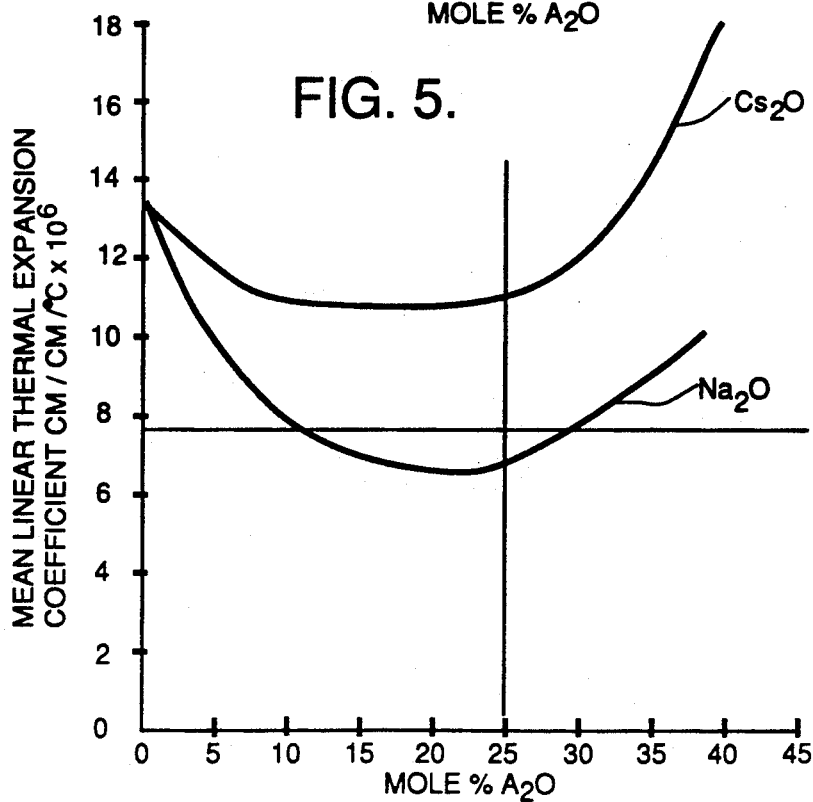
FIG. 5 is a graph showing the curves for calculating $Na_2O$ to $Cs_2O$ ratios to provide the glass composition of the present invention.

In fine tuning the composition to meet a particular need, it is found that the key determinants are the viscosity and coefficient of thermal expansion. The viscosity of borate glasses having a general composition as defined above varies monotonically, and approximately linearly, with $A_2O$, the total alkali oxide content (in mole %), wherein A is LI, Na, K, Rb, Cs or Fr, of the finished glass. The thermal expansion coefficient varies with composition in a complex way, as shown in FIG. 4 which is taken from a paper written by D. R. Uhlman and R. R. Shaw published in the Journal of Non-Crystalline Solids (1,347 (1969)). FIG. 4 shows the dependance of the thermal expansion coefficient of alkali borate glasses as a function of their alkali oxide content. As plotted therein, the possible thermal expansion coefficients for alkali borate glasses containing only one alkali metal species are limited to points on the curve associated with that alkali metal species. For such a glass composition, if one chooses a total mole % alkali oxide to provide the desired viscosity in the finished glass, only one value for the thermal expansion coefficient is possible. On the other hand, if one chooses the desired thermal expansion coefficient, only one or, at most two alkali oxide compositions are possible. As a result, with glasses containing only one alkali metal oxide species, it would be entirely coincidental if the desired values of both viscosity and thermal expansion coefficient were obtained in the same glass composition. The possibilities for so doing are further limited by the fact that lithium and potassium containing glasses cannot be used because these metals are readily leached from the glass by the liquid sodium. Furthermore, the use of rubidium and francium containing glasses is limited by their scarcity and cost. Therefore, for all practical purposes only sodium and cesium containing borate glasses can be considered as being useful for sodium-sulfur battery applications. A modification of FIG. 4 showing just the effects of sodium and cesium is shown as FIG. 5. For the purposes of illustration let us assume that a glass with the optimum viscosity for processing and use contains 25 mole % alkali oxide. An analysis of the data from FIG. 4, as depicted in FIG. 5, shows the optimum or most preferred composition to be: 19.6 mole % $Na_2O$, 5.4 mole % $Cs_2O$, and 75.00 mole % $B_2O_3$. The glass composition has been designed specifically so that the percentages of the two alkali oxide constituents can be varied to provide a more-or-less exact match to the thermal expansion coefficient of beta"-$Al_2O_3$. The glass also has a sufficiently high viscosity at about 350° C. that it will not flow or creep during the lifetime of the cell. If a thermal expansion coefficient that is intermediate between those of beta" $Al_2O_3$ and $TiO_2$ is desired, this can be achieved by altering the $Na_2O$ to $Cs_2O$ ratio as described above, while maintaining constant viscosity by holding the total alkali oxide content of the glass ($Na_2O+Cs_2O$) constant. If a higher or lower viscosity is desired, this can be achieved by altering the total alkali oxide content of the glass, while maintaining a constant thermal expansion coefficient by holding the $Na_2O$ to $Cs_2O$ ratio constant. The ability to fine tune the glass to provide the optimum expansion coefficient, while retaining the desired viscosity, is a desirable feature of this invention.

The glass composition may be prepared by mixing powders of sodium metaborate, boric acid, sodium carbonate, and cesium carbonate in the correct ratios to obtain the above composition, melting the mixture in a glass-making muffle furnace at high temperature using a platinum or zirconium crucible. Homogenization is achieved by occasional stirring or by bubbling $O_2$ through the melt using a platinum tube. The glass is then poured out onto graphite to cool. Particularly for application to fused titania, it is most convenient to use standard screen printing techniques to apply the glass in a pattern as shown in FIG. 3. For this purpose, the glass is ground into a powder of suitable particle size distribution, and made into a paste using an anhydrous organic liquid such as cumene, toluene or benzene as a vehicle, and a polymeric or high molecular weight organic material such as alpha methyl polystyrene as a binder.

Suitable materials include those that do not absorb appreciable water from the atmosphere, and those that burn off cleanly during the process of fusing the glass powder to make the seal. A number of these materials are well known to those skilled in screen printing of glass powders or glass-containing metallizations. Since all borate glasses are highly hygroscopic, the glass should be prepared, ground, and subsequently handled under controlled and reduced humidity conditions. But, because beta"-$Al_2O_3$ is also hygroscopic, this condition should pose no special requirements on the battery assembly process.

After screen printing the glass onto the titania support in the appropriate pattern, the beta"-$Al_2O_3$ sheet is placed upon the glass, and the assembly is fired in a vacuum furnace to volatilize the organic species, melt and fuse the glass powder, and form a tight seal between the beta"-$Al_2O_3$ and the $TiO_2$. The structure should be cooled from fusing temperature to room temperature gradually, preferably at a rate of around 1° C./min for the temperature range between the softening point and the strain point of the glass. At lower temperatures, it may be cooled at faster rates.

Thus there has been described new and improved glass compositions for use in sealing sodium-sulfur batteries. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A separator for use in a sodium-sulfur battery, the separator comprising a solid electrolyte; a glass seal, wherein the glass comprises from 18-23 mole % $Na_2O$, from 3-7 mole % $Cs_2O$ and the balance $B_2O_3$; and a porous support plate, wherein the glass seal bond and seals the solid electrolyte to the porous support plate.

2. The separator of claim 1, wherein the $B_2O_3$ comprises about 75 mole %.

3. The separator of claim 1 wherein the $Na_2O$ comprises from 19-21 mole % and the $Cs_2O$ comprises from 4-6 mole %.

4. The separator of claim 1 wherein the solid electrolyte comprises beta"-$Al_2O_3$ and the porous support plate is formed of a material selected from the group consisting of graphite and fused titania.

5. In a sodium-sulfur battery having a separator, a method of sealing the separator, comprising the steps of:
   providing a solid electrolyte;
   depositing a sealing glass on the electrolyte, wherein the glass comprises from 18-23 mole % $Na_2O$, from 3-7 mole % $Cs_2O$ and the balance $B_2O_3$;
   providing a porous support plate on the sealing glass; and
   heating the assembled structure so as to fuse the glass to the solid electrolyte and the support plate.

6. The method of claim 5 wherein the solid electrolyte comprises beta"-$Al_2O_3$ and the porous support plate is formed of a material selected from the group consisting of graphite and fused titania.

* * * * *